FIG. I.

INVENTORS.
RICHARD G. MALLON,
WILMER A. HOYER,
BY
ATTORNE

Jan. 31, 1967 R. G. MALLON ET AL 3,302,026
ION SOURCE NEUTRON GENERATOR HAVING
MAGNETICALLY STABILIZED PLASMA
Filed July 25, 1963 2 Sheets-Sheet 2

INVENTORS.
RICHARD G. MALLON,
WILMER A. HOYER,
BY
ATTORNE

United States Patent Office 3,302,026  
Patented Jan. 31, 1967

3,302,026  
ION SOURCE NEUTRON GENERATOR HAVING MAGNETICALLY STABILIZED PLASMA  
Richard G. Mallon and Wilmer A. Hoyer, Houston, Tex., assignors, by mesne assignments, to Esso Production Research Company, Houston, Tex., a corporation of Delaware  
Filed July 25, 1963, Ser. No. 297,511  
14 Claims. (Cl. 250—84.5)

The present invention concerns an ion source neutron generator primarily adaptable for use in a logging sonde designed to investigate subsurface earth formations. More particularly, the invention concerns stabilization of plasma used in the ion source neutron generator.

A direct and accurate way to determine the nature of underground mineral deposits is to ascertain the chemical elements located in the subsurface formations.

One desirable method for locating chemical elements in subsurface formations consists of bombarding the formations surrounding a borehole with high energy neutrons (14 mev.) generated in the borehole and observing the gamma rays resulting from reactions of the neutrons with the chemical elements of the formations. The neutron generator for the bombarding neutrons is preferably pulsed to optimize the detection of gamma rays resulting from inelastic neutron scattering reactions.

One type of particle accelerator that has been used to produce bursts of neutrons in boreholes utilizes ion generating and accelerating apparatus for directing high-speed ions at a suitable target to cause emission of neutrons. Depending upon the type reaction (D-T or D-D) employed, either deuterium or tritium ion plasma is formed by radio frequency heating of deuterium or tritium gas in a neutron generator tube. The heating of the plasma is steady and not pulsed. By the term "plasma" is meant that state of an ionized gas in which the concentrations of negative and positive charges are almost equal. For a discussion of ionized gas plasma, see "Operating Characteristics of a High Yield R.F. Ion Source" by H. P. Eubank, R. Truell, and R. A. Peck, Jr., Review of Scientific Instruments, vol. 25, No 10, pp. 989–995. The ions are extracted by an extraction voltage and accelerated toward the target by means of a high potential gradient of a pulsing circuit. The accelerated ions are directed at the target and interaction of the high-speed deuterons and the tritium (or deuterium) in the target causes emission of neutrons.

The neutron generator of the present invention is of this type and is an improvement over prior art generators primarily in providing a magnetically stabilized plasma suitable for borehole operations which has increased yield and stability.

In a neutron generator such as described and claimed in U.S. patent application Serial No. 241,444, entitled, "Pulsed Neutron Source," by W. A. Hoyer and Robert C. Rumble, filed November 30, 1962, and which issued as Patent No. 3,185,849, the R.F. excited plasma is a good source of deuterium or tritium ions, as it produces an abundance of ions, about 80% of which are mono-atomic. However, the ion plasma of this generator tends to be unstable and will extinguish or exhibit varying degrees of stability under certain conditions. The improvement of the present invention eliminates these troublesome features by applying to the ion source a magnetic mirror field that may be either pulsed or continuous.

Thus, the present invention essentially comprises method and apparatus for improving the stability of plasma formed by radio-frequency heating thereof in a neutron generator by applying to the plasma a magnetic mirror field. The apparatus comprises, briefly, a closed tube; an extraction electrode arranged in the tube dividing the tube into an ionizing chamber and an accelerating chamber; ion plasma contained in the ionizing chamber; radio-frequency means for forming the ion plasma; neutron generating target material positioned in the accelerating chamber; means for supplying high voltage pulses to the target and extraction voltage pulses to the extraction electrode to accelerate ions to the target to produce bursts of neutrons; and magnetic mirror means positioned adjacent the tube adapted to apply a magnetic field to the plasma to hold the plasma away from the solid walls of the tube to reduce the loss rate of the plasma and thereby stabilize it. The tube may also contain control means mounted in the accelerator tube for adjusting the pressure of the deuterium or tritium gas within the tube to reactivate it. A delay network in the extraction circuit provides an economical introduction of ions into the accelerating chamber or gap.

A primary object of the present invention is to provide an improved ion source neutron generator having a magnetically stabilized plasma of improved yield and stability achieved with small electrical power consumption.

The above object and other objects and advantages of the invention will be apparent from a more detailed description of the invention when taken with the drawings wherein.

Figure 1:
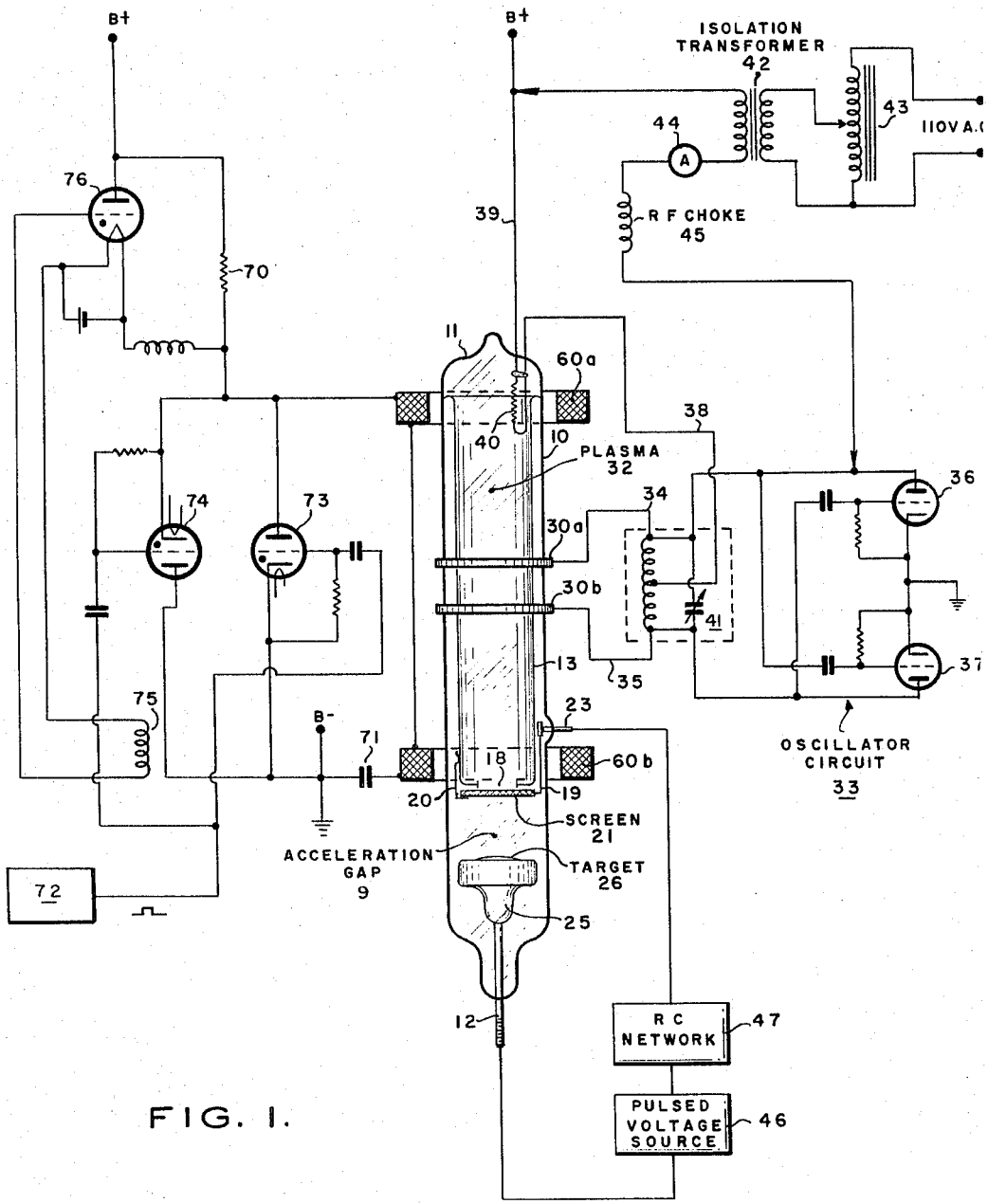
FIG. 1 is a vertical view of the accelerator tube of the invention showing therewith, diagrammatically, various electrical circuits including a mirror pulsing circuit of the invention as well as an RC delay network, an R.F. oscillator circuit, and a gas pressure control circuit.

In FIG. 1 is shown a glass envelope or tube 10 closed at its upper end as at neck portion 11 and at its lower end by a Kovar conductor rod 12 threaded at each end and sealed thereto. An open-ended inner concentric glass cylinder 13 is attached to and supported within tube 10 by means of a ring seal. The lower open end of cylinder 13 is squared off to provide an opening 18 of reduced diameter.

A pre-formed extraction electrode 19 is attached to the lower end of cylinder 13 by means of three-preformed, stainless steel spring members 20. A steel screen member 21 of a desired gauge and size is positioned on extraction electrode 19 over the opening therein in alignment with opening 18.

A domed target pedestal 25 is threaded to the upper end of rod 12 and serves both as a mechanical support for tube 10 and as an electrical lead through to a convex disc-shaped target 26 which is mounted on pedestal 25 and urged into close heat conducting contact with the domed surface of pedestal 25.

Target 26 may be a thin disk of some metal such as platinum, copper, molybdenum, stainless steel, nickel, or the like, on one surface of which has been evaporated some stable hydrogen absorbing metal such as zirconium. Deuterium targets may be formed naturally inside accelerator tube 10 if target blanks covered with evaporated zirconium are subjected to impingement by deuterium ions accelerated by high voltage across the accelerating gap. Deuterium atoms absorbed in the zirconium layer become target atoms. Tritium targets are made by subjecting target blanks to a tritium atmosphere under controlled conditions of temperature and pressure.

Two split ring R.F. electrodes 30$a$, $b$ are arranged on the outside of tube 10 and centered between two magnet coils 60$a$, $b$ which are positioned adjacent the upper end and the screen 21, respectively, of tube 10. Electrodes 30$a$, $b$ are connected to a high frequency oscillator circuit 33 which includes leads 34 and 35 coupled to vacuum tubes 36 and 37 through the coil and variable capacitor 41. A lead 38 connects the coil to B+ lead 39 through a tungsten filament 40. Oscillator 33 preferably operates at 45 megacycles and about 40 watts power output. During pulsing of the tube, high-frequency electrodes 30a, b are preferably charged to 600 to 700 volts positive to power the oscillator.

Deuterium or tritium ion plasma 32 is interspersed throughout the interior of inner cylinder 13 and is formed by interaction with high-frequency current flowing through electrodes 30a and 30b.

Filament 40 extends into plasma 32 near the apex of tube 10 and together with a helical coil of fine zirconium wire closely wrapped about the tungsten filament serves to lower or raise the plasma pressure inside tube 10 to reactivate tubes that have become inoperative because of excess or insufficient plasma pressure. The plasma pressure is regulated by the amount of current flowing through filament 40, and a circuit for controlling this current is attachable to oscillator circuit 33. This control circuit includes an isolation transformer 42, the primary of which is connected to a 110 volt A.C. source through a Variac 43. One terminal of the secondary is attached to B+ lead 39, and the other terminal is attached to coil 35 through a series connected ammeter 44 and R.F. choke 45.

In this arrangement gas pressure inside the accelerator tube is adjustable with the tube in situ in the logging sonde. The neutron flux is monitored with the oscillator functioning and while the neutron generator is actually being pulsed.

A pulsed voltage source 46 supplies high voltage (approximately 100 kv.) negative pulses of about 5 microsecond duration, and varying in frequency up to 5,000 pulses per second to conductor rod 12. Lower voltage (approximately 4.5 kv.) negative pulses are supplied to extraction electrode 19 by pulsed voltage source 46. U.S. Patent No. 2,907,900 issued to Hoyer et al., February 25, 1959, shows and describes a preferred pulse generator which may be used as the pulse voltage source. This pulse generator system includes a high voltage transformer from which the high voltage pulses are produced. The extraction voltage pulses are derived from the primary voltage pulses of the high voltage transformer, and in consequence thereof, correspond in frequency with the high voltage pulses and are approximately coincident to them.

A delay network 47, which consists of a small, time-constant RC network, functions to change the phase relation between the extraction pulses and the high voltage pulses so as to delay slightly the ion extraction process until the accelerating voltage has reached the threshold value required for the deuterium-tritium (or deuterium) reaction and provides for most economical introduction of ions into the accelerating gap.

Figure 2:
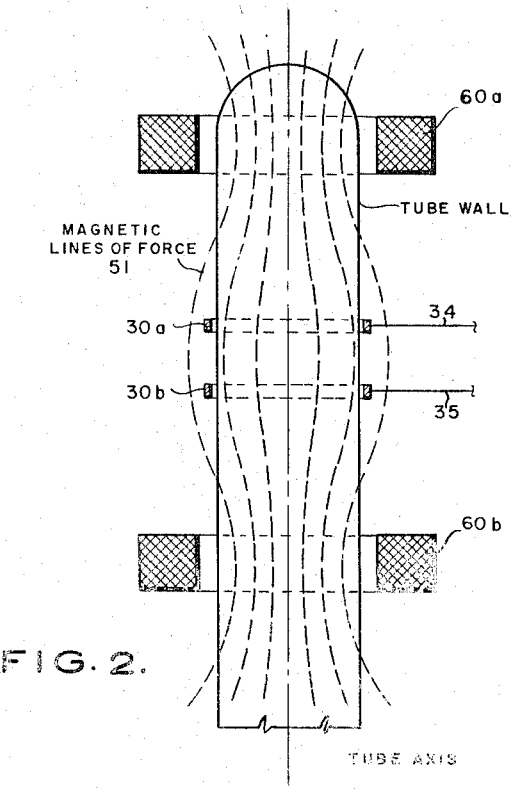
FIG. 2 is a schematic view of the ionizing portion of the accelerator tube illustrating the magnetic lines of force.

The magnetic mirror consists of a pair of identical circular coils 60a, b with a common axis, the axis of tube 10. The vertical spacing of the coils is about twice the inside diameter of the coils. The current direction is such that the magnetic fields of the coils are in the same direction along the common axis. FIG. 2 illustrates the magnetic lines of force designated 51. When a charged particle moves in a magnetic field, the force on the particle is perpendicular to the direction of motion and to the magnetic field direction. The action of the magnetic field of FIG. 2 on an ion or electron moving perpendicular to the axis of tube 10 is to cause the particle to rotate about the magnetic field lines. The radius of rotation can be calculated and depends on the particle energy, the mass of the particle, and the magnetic field. For electrons of 2,000 ev. energy and with a magnetic field of 300 gauss, a ½ cm. radius of rotation will be produced about a magnetic field line. On the other hand, confinement of 2,000 ev. deuterium ions to a radius of ½ cm. requires a field of about 20 kilogauss. Thus, electron confinement by a magnetic field is of primary concern because of the energy requirements to produce such magnetic fields.

Power requirements necessary to produce steady magnetic field strengths of about 300 gauss are on the order of 1 kw., which is high for well bore work. However, by pulsing the magnetic field in synchronism with the ion accelerating potential, the power consumption can be reduced to a negligible amount (less than 20 watts). The pulsed magnetic field in no way reduces the stabilizing effects on the ion plasma. The magnetic field pulse is preferably obtained by discharging a capacitor through the inductance of the magnet coils 60a, b using a hydrogen thyratron switch. A circuit for repetitively pulsing the magnetic mirror coils which employs two additional thyratrons is illustrated in FIG. 1. A description of the operation of this circuit follows.

Figure 3A:
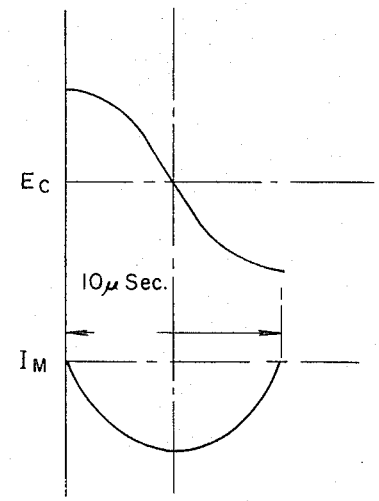
FIGS. 3 A and 3B represent voltage-current relationships of a pulsed L-C circuit.
Figure 3B:
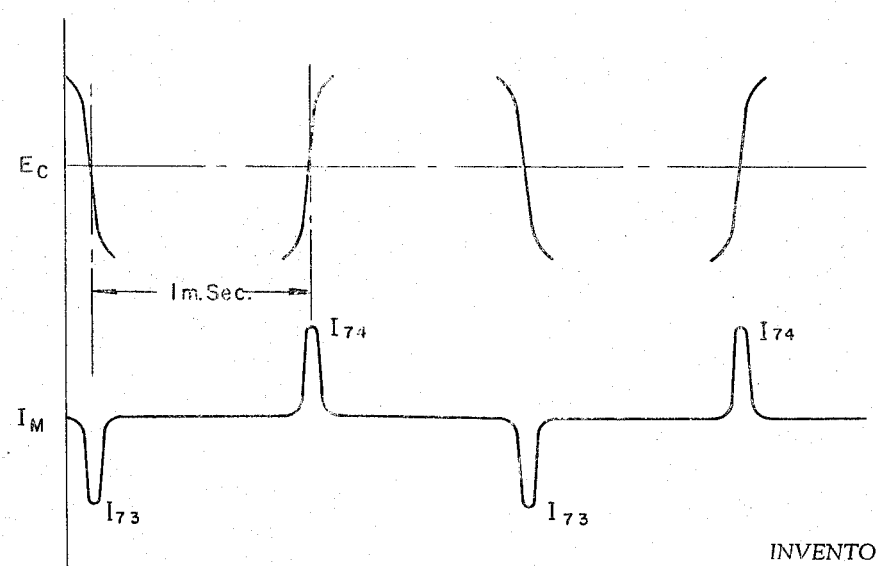

When B+ voltage power supply is turned on, resistance 70 slowly charges capacitor 71 to B+ voltage. The resistance-capacitance time constant must be long compared to the time interval between pulses. When a trigger pulse from a pulse source 72 appears, only hydrogen thyratron 73 has the proper potential polarity and hence, it fires and discharges capacitor 71. As seen in FIG. 3A, the voltage-current relationship of a parallel L-C circuit has a 90° phase difference between the voltage and current; and consequently, capacitor 71 is left with a charge of reversed polarity at current zero, or at the extinguishing of thyratron 73. When the next trigger pulse from pulse source 72 appears, hydrogen thyratron 74 has the correct potential polarity, and hence, it fires. After thyratron 74 has fired, capacitor 71 has the same polarity as it originally had. Near the end of the second pulse, a pickup coil 75 in the anode circuit of thyratron 74 causes hydrogen thyratron 76 to fire, which charges capacitor 71 back to B+ voltage. The conduction of thyratron 76 compensates for losses in the circuit. The long time sequence in the voltage-current is illustrated in FIG. 3B.

The pulse duration of the magnetic field is proportional to the product $\sqrt{LC}$. The coils for the pulsed field have low inductance in order to provide the desired short pulse duration. A typical set of coils consists of 7 turns of #10 wire for each coil, the inductance of which pair is 7 microhenries. When a one microfarad capacitor is discharged through this set of coils, as shown in FIGS. 1 and 2, a 10 microsecond magnetic field is produced.

The mirror pulsing circuit is preferably operated in synchronism with the ion accelerating potential. The same pulse source may be used for both the pulsed voltage source 46 and the mirror pulsing circuit. This results in a neutron generator having greater stability and greater neutron yield due to the greater number of monoatomic ions produced.

The capacitive coupling between the high-frequency rings 30a, b, ion plasma 32, and extraction electrode 19, when pulsed, accounts for the supply of ions which are drawn toward and through the screen mesh 21 of extraction electrode 19 into the acceleration gap 9 between electrode 19 and target 26.

The wire mesh of the screen facilitates dispersion of the ion beam leading into the accelerating gap. The wire mesh screen provides a much more uniformly dispersed ion beam with less concentrated heating of the target. The hole fineness of the screen is sufficient to allow ion passage and at the same time, shield the plasma from the high voltage field. This results in the formation of much fewer secondary electrons and in the dispersion of those present over wide areas of the tube during its operation.

As discussed above, the metal screen 21 serves as an extraction electrode and is pulsed negative at about 4.5 kv. to coincide with the 100 kv. pulse on the target. It is to be noted that this electrode is directly exposed to plasma 32 contrary to prior art teachings that the electrode should not be exposed to the plasma of the generator because it would be harmful to neutron generation by drawing all the ions of the plasma to the extraction electrode, thereby quenching the plasma and converting mono-atomic ions exposed to the metallic electrode to the diatomic state, which due to their increased mass would be difficult to accelerate to the desired velocity in the accelerating gap.

Important advantages of the neutron generator of the invention over known prior art neutron generators include: improved stability of the neutron generator's ion source; greater neutron yield; and improved low power consuming magnetic fields.

Having fully described the nature, objects, apparatus and operation of our invention, we claim:

1. Apparatus for use in generating neutrons comprising:
   a closed tube;
   an extraction electrode arranged in said tube and including a mesh screen dividing said tube into an accelerator chamber and an ionizing chamber;
   high frequency means surrounding the ionizing chamber of said tube;
   ion plasma contained within said ionizing chamber;
   a target arranged in said accelerator chamber;
   an electrical oscillator means connected to said high frequency means adapted to supply continuous high frequency current to said high frequency means to ionize said plasma;
   a pulsed voltage source connected to said target and to said extraction electrode adapted to apply high voltage pulses to said target and extraction voltage pulses to said extraction electrode to produce bursts of neutrons;
   magnetic mirror field means adapted to apply a magnetic mirror field to said plasma to stabilize said plasma;
   a circuit having a capacitor in series with said magnetic mirror field means and capable of being discharged through the inductance thereof;
   means for charging said capacitor; and
   a thyratron capable of discharging said charged capacitor upon the appearance of a voltage pulse on the grid thereof.

2. Apparatus for use in generating neutrons comprising:
   a closed tube;
   an extraction electrode arranged in said tube and including a mesh screen dividing said tube into an accelerator chamber and an ionizing chamber;
   high frequency means surrounding the ionizing chamber of said tube;
   ion plasma contained within said ionizing chamber;
   a target arranged in said accelerator chamber;
   an electrical oscillator means connected to said high frequency means adapted to supply continuous high frequency current to said high frequency means to ionize said plasma;
   a pulsed voltage source connected to said target and to said extraction electrode adapted to apply high voltage pulses to said target and extraction voltage pulses to said extraction electrode to produce bursts of neutrons;
   magnetic mirror field means adapted to apply a magnetic mirror field to said plasma to stabilize said plasma;
   circuit means adapted to pulse said magnetic mirror field means;
   a capacitor in series with said magnetic mirror field means and capable of being discharged through the inductance thereof;
   means for charging said capacitor;
   a first thyratron capable of discharging said charged capacitor upon appearance of a voltage pulse on the grid thereof leaving said capacitor with reversed polarity charge;
   a second thyratron capable of discharging said capacitor with its reverse polarity charge upon appearance on the grid thereof of the next succeeding voltage pulse;
   a third thyratron capable of charging said capacitor back to its initially charged voltage in response to the appearance of said next succeeding voltage pulse, the conduction of said third thyratron compensating for losses in said circuit;
   a pulse source for supplying said voltage pulses to said first and second thyratrons; and
   a resistance in series with said capacitor, said resistance-capacitance time constant being long relative to the time interval between pulses.

3. Apparatus for use in generating neutrons comprising:
   a closed tube;
   an ionizing chamber within said tube;
   ion plasma contained in said ionizing chamber;
   high frequency means adapted to form said plasma;
   magnetic mirror field means adapted to apply a mirror magnetic field to said plasma for improving stability thereof;
   a circuit having a capacitor in series with said magnetic mirror field means and capable of being discharged through the inductance thereof;
   means for charging said capacitor; and
   a thyratron capable of discharging said charged capacitor upon the appearance of a voltage pulse on the grid thereof.

4. Apparatus for use in generating neutrons comprising:
   a closed tube;
   an ionizing chamber within said tube;
   ion plasma contained in said ionizing chamber;
   high frequency means adapted to form said plasma;
   magnetic mirror field means adapted to apply a mirror magnetic field to said plasma for improving stability thereof;
   circuit means adapted to pulse said magnetic mirror field means;
   a capacitor in series with said magnetic mirror field means and capable of being discharged through the inductance thereof;
   means for charging said capacitor;
   a first thyratron capable of discharging said charged capacitor upon appearance of a voltage pulse on the grid thereof leaving said capacitor with reversed polarity charge;
   a second thyratron capable of discharging said capacitor with its reverse polarity charge upon appearance on the grid thereof of the next succeeding voltage pulse;
   a third thyratron capable of charging said capacitor back to its initially charged voltage in response to the appearance of said next succeeding voltage pulse, the conduction of said third thyratron compensating for losses in said circuit;
   a pulse source for supplying said voltage pulses to said first and second thyratrons; and
   a resistance in series with said capacitor, said resistance-capacitance time constant being long relative to the time interval between pulses.

5. In a method for use in well bore logging operations in which neutrons are generated in a tube by forming ion plasma in an ionizing chamber thereof and accelerating the ions to a target in an accelerating chamber thereof to produce neutrons, the improvement comprising the steps of:
   applying a magnetic mirror field to said plasma to confine and thereby stabilize said plasma;
   pulsing and applying said magnetic mirror field by periodically discharging a slowly charged capacitor through the inductance of a pair of circular magnet coils which encircle said tube and have axes common with the axis of said tube; and pulsing said ion accelerating potential in synchronism with pulsing of said magnetic mirror field.

6. Apparatus for use in generating neutrons comprising:
   a closed tube;
   an extraction electrode arranged in said tube and including a mesh screen dividing said tube into an accelerator chamber and an ionizing chamber;
   high frequency means surrounding the ionizing chamber of said tube;
   ion plasma contained within said ionizing chamber;
   a target arranged in said accelerator chamber;
   an electrical oscillator means connected to said high frequency means adapted to supply continuous high frequency current to said high frequency means to ionize said plasma;
   a pulsed voltage source connected to said target and to said extraction electrode adapted to apply high voltage pulses to said target and extraction voltage pulses to said extraction electrode to produce bursts of neutrons; and
   magnetic mirror field means adapted to apply a magnetic mirror field to confine said plasma to reduce the loss rate and stabilize said plasma, said magnetic mirror field means including two spaced-apart circular magnet coils encircling said tube and each having a common axis with said tube.

7. Apparatus as recited in claim 6 wherein said high frequency means includes two adjacent split-ring electrodes centered between said magnet coils.

8. Apparatus for use in generating neutrons comprising:
   a closed tube;
   an extraction electrode arranged in said tube and including a mesh screen dividing said tube into an accelerator chamber and an ionizing chamber;
   high frequency means surrounding the ionizing chamber of said tube;
   ion plasma contained within said ionizing chamber;
   a target arranged in said accelerator chamber;
   an electrical oscillator means connected to said high frequency means adapted to supply continuous high frequency current to said high frequency means to ionize said plasma;
   a pulsed voltage source connected to said target and to said extraction electrode adapted to apply high voltage pulses to said target and extraction voltage pulses to said extraction electrode to produce bursts of neutrons;
   magnetic mirror field means adapted to apply a magnetic mirror field to confine said plasma to reduce the loss rate and stabilize said plasma; and
   circuit means adapted to pulse said magnetic mirror field means.

9. Apparatus for use in generating neutrons comprising:
   a closed tube;
   an ionizing chamber within said tube;
   ion plasma contained in said ionizing chamber;
   high frequency means adapted to form said plasma; and
   magnetic mirror field means adapted to apply a mirror magnetic field to confine said plasma for reducing the loss rate and improving stability thereof, said magnetic mirror field means including two spaced-apart circular magnet coils encircling said tube and each having a common axis with said tube.

10. Apparatus as recited in claim 9 wherein said high frequency means includes two adjacent split-ring electrodes centered between said magnet coils.

11. Apparatus for use in generating neutrons comprising:
    a closed tube;
    an ionizing chamber within said tube;
    ion plasma contained in said ionizing chamber;
    high frequency means adapted to form said plasma;
    magnetic mirror field means adapted to apply a mirror magnetic field to confine said plasma for reducing the loss rate and improving stability thereof; and
    circuit means adapted to pulse said magnetic mirror field means.

12. In a method for use in well bore logging operations in which neutrons are generated in a tube by forming ion plasma in an ionizing chamber thereof and accelerating the ions to a target in an accelerating chamber thereof to produce neutrons, the improvement comprising:
    applying a magnetic mirror field to said plasma to confine and reduce the loss rate of said plasma and thereby stabilize said plasma, wherein said magnetic mirror field is pulsed and applied by periodically discharging a slowly charged capacitor through the inductance of a pair of circular magnet coils which encircle said tube and have axes common with the axis of said tube.

13. Apparatus as recited in claim 8 wherein said pulsing means comprises:
    a capacitor in series with said magnetic mirror field means;
    first, second and third sequentially fired thyratron switches, said first switch being adapted to discharge said capacitor when said capacitor is of an initial polarity charge leaving said capacitor with an opposite polarity charge, and said second switch being adapted to discharge said capacitor when said capacitor is of said opposite polarity charge, and said third switch being adapted to charge said capacitor to said capacitor's initial polarity charge.

14. Apparatus as recited in claim 11 wherein said pulsing means comprises:
    a capacitor in series with said magnetic mirror field means;
    first, second and third sequentially fired thyratron switches, said first switch being adapted to discharge said capacitor when said capacitor is of an initial polarity charge leaving said capacitor with an opposite polarity charge, and said second switch being adapted to discharge said capacitor when said capacitor is of said opposite polarity charge, and said third switch being adapted to charge said capacitor to said capacitor's initial polarity charge.

References Cited by the Examiner
UNITED STATES PATENTS

| | | | |
|---|---|---|---|
| 2,892,114 | 6/1959 | Kirkpatrick | 313—63 |
| 3,015,032 | 12/1961 | Hoyer | 250—84.5 |

ARCHIE R. BORCHELT, *Primary Examiner.*

JAMES W. LAWRENCE, RALPH G. NILSON,
*Examiners.*